F. HERZOG.
STEAM TABLE AND DISH WARMER.
APPLICATION FILED JAN. 4, 1912.
1,044,525.
Patented Nov. 19, 1912.
2 SHEETS—SHEET 1.
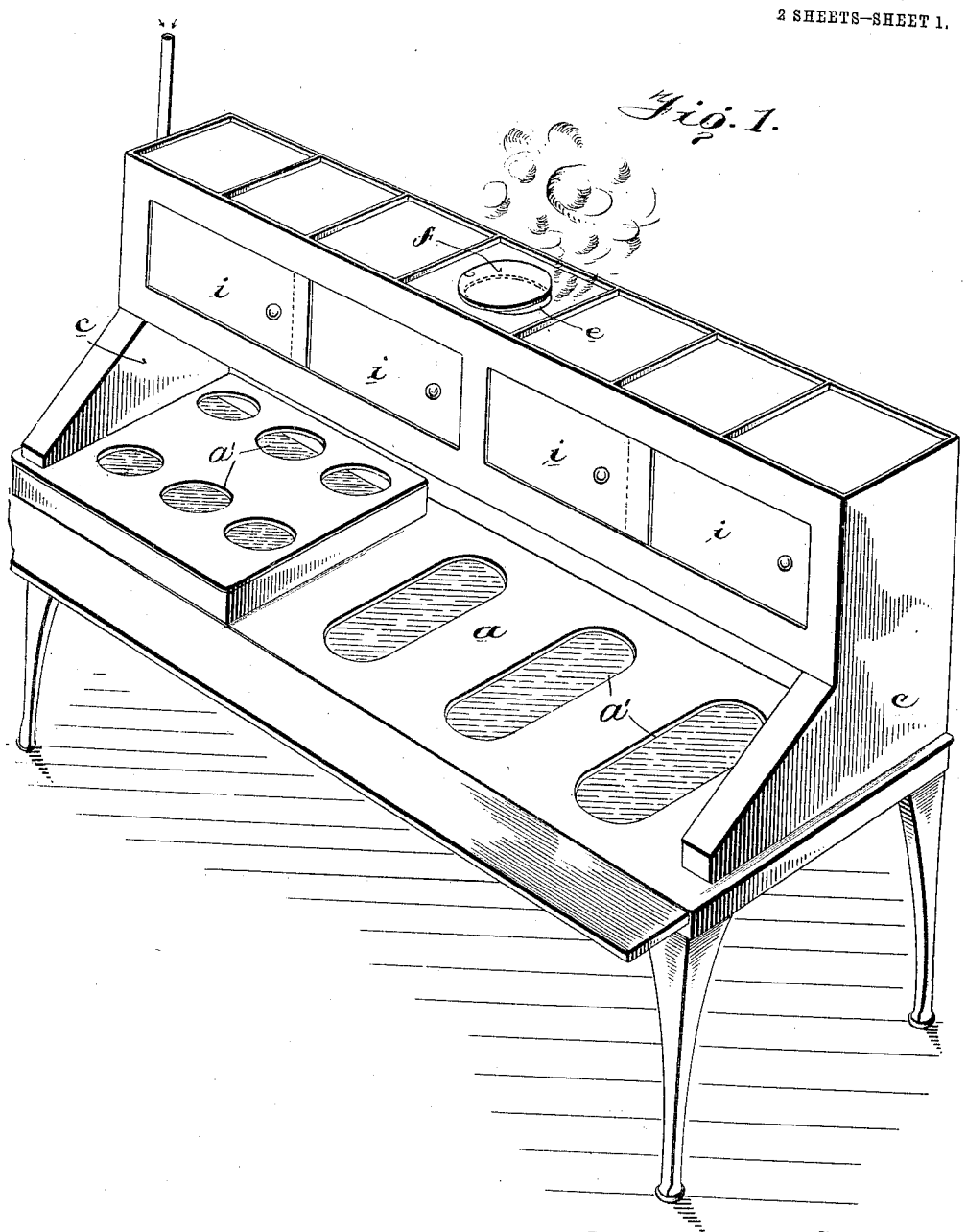

F. HERZOG.
STEAM TABLE AND DISH WARMER.
APPLICATION FILED JAN. 4, 1912.
1,044,525.
Patented Nov. 19, 1912.
2 SHEETS—SHEET 2.
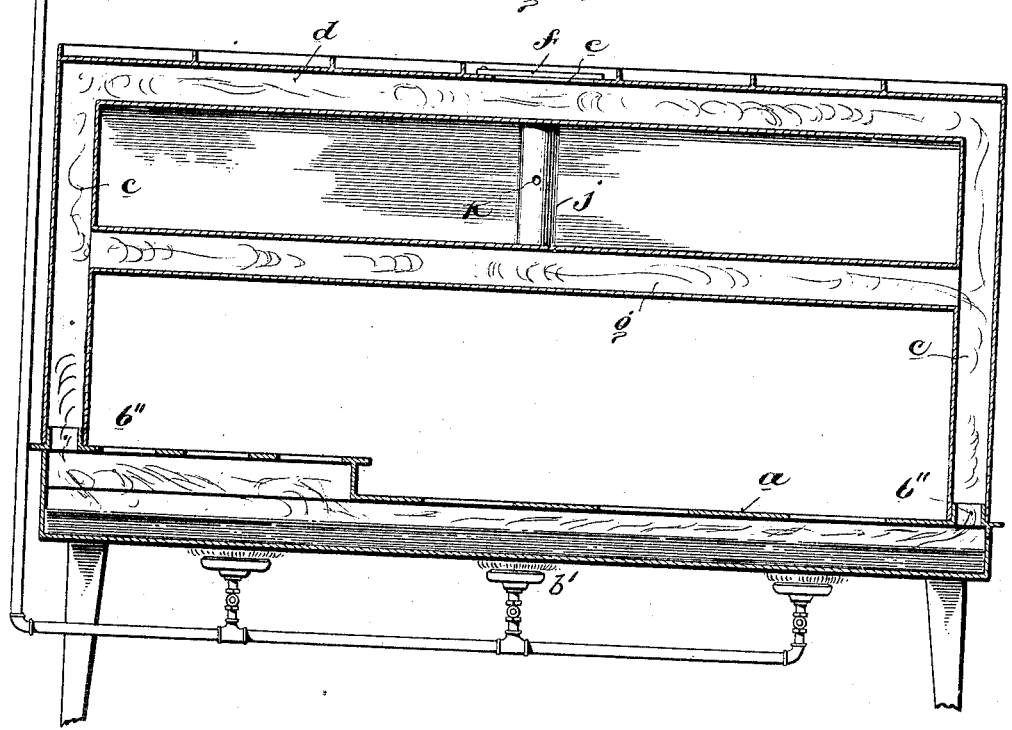
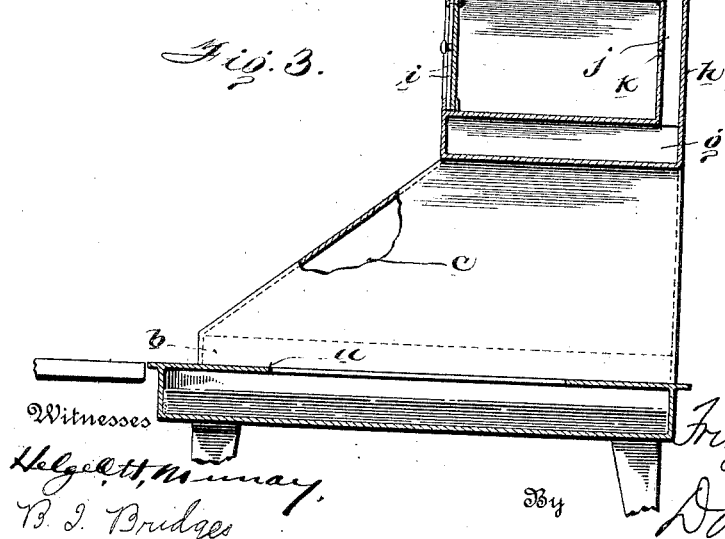
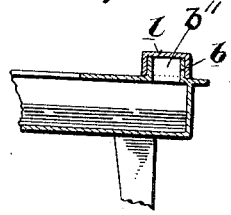

UNITED STATES PATENT OFFICE.

FRITZ HERZOG, OF WASHINGTON, DISTRICT OF COLUMBIA.

STEAM-TABLE AND DISH-WARMER.

1,044,525.

Specification of Letters Patent. Patented Nov. 19, 1912.

Application filed January 4, 1912. Serial No. 669,482.

*To all whom it may concern:*

Be it known that I, FRITZ HERZOG, a citizen of the United States, and a resident of Washington, in the District of Columbia, have invented certain new and useful Improvements in Steam-Tables and Dish-Warmers, of which the following is a full and clear specification, reference being had to the accompanying drawings, in which—

Figure 1 is a perspective view of my apparatus complete; Fig. 2 a vertical longitudinal sectional view thereof taken on the line 2—2 of Fig. 3; Fig. 3 a vertical transverse section taken on the line 3—3 of Fig. 2; and Fig. 4 a detail vertical section showing one of the caps used when the dish warming oven is removed from the steam table.

The object of this invention is to provide simple means for utilizing the waste steam of the steam table to heat a dish warming oven, as more fully hereinafter set forth.

In the drawings, $a$ designates a hollow metal steam table of ordinary construction, the top plate of the table being provided with the usual series of openings $a'$ for the reception of the cooking utensils and suitable means, such as burners $b'$ being arranged under the table to heat the same. Formed in the top wall of the table, across each end of the table, is a slot-like opening $b''$ provided around its edge with an upstanding flange $b$.

Fitted down over each of these flanges is the lower open end of a hollow sheet metal leg $c$, each constituting a steam chamber. Connecting the upper ends of these upright steam chambers or legs is a horizontal hollow sheet metal steam chamber $d$, in the upper wall of which about mid-way its length is an escape opening $e$ whose area is adapted to be varied by means of a suitable adjustable plate $f$. Another horizontal hollow steam chamber $g$ connects the legs $c$ at a suitable distance below the upper chamber, and the cavity or oven formed by the two steam chambers $d$ and $g$ is closed at the back by a permanent wall $h$ and at the front by a series of suitable sliding doors $i$, thus forming an oven-like chamber $i'$ which will be heated by the steam circulating in the vertical and horizontal chambers, which chambers constitute the walls of the apparatus.

It will be observed that when the valve $f$ is opened to permit the hot vapor or steam to escape, there will be a circulation of steam up through the hollow legs and along the top wall of the oven to the escape opening. In practice I find that it requires but a very slight escape opening to cause a sufficient circulation of the hot vapor to keep the oven warm, so that only the waste steam is needed for the oven, the increase in the quantity of fuel employed as compared with the ordinary steam table being inappreciable.

Should the circulation of the hot vapor through the hollow wall $g$ be insufficient, I may cause a positive circulation therein by connecting said wall, about mid-way its length, to the upper hollow wall by means of a tube $j$, and in order that the dishes in the oven may be kept slightly moist I provide said tube with a small opening $k$, whereby a very small quantity of the hot vapor may pass into the oven and be condensed upon the surfaces of the dishes.

It will be observed that the oven attachment may be lifted off the steam table, in case it is temporarily not needed, as might be the case in the warm seasons or climates. When the oven attachment is thus removed from the table, I cover each of the flanged openings with a removable cover plate 1, as shown in Fig. 4.

It will be observed that my improvements have relation to that type of steam cooking tables used in restaurants and which consist of a long horizontal metallic shell or chamber the lower part of which serves as the water space and the upper part of which serves as a steam space, the water level being at all times of course kept below the top plate in order to prevent over-flow through the utensil-receiving openings in the top plate. When used in connection with a cooking table of this type my improvement is adapted to make use of the waste heat, that is, the heat not needed for cooking purposes, and it will be observed that it is important in my invention that an ample outlet for the waste steam or hot vapor shall be provided at each end of the steam space of the cooker, and also that a too free escape of the vapor at the top of the superstructure shall be prevented since if an escape opening or outlet for a considerable volume of the hot vapor should be provided there would not only be a wasteful consumption of the steam needed for cooking purposes but there would result in a too great heating of the warming oven. It is important therefore that an escape opening at the top of the oven structure shall be provided which shall permit of but a small volume of the vapor to escape in order that only a gentle circulation of the vapor shall be permitted, since but a gentle circulation is needed for the purpose of keeping the oven warm and furthermore, as stated, a more vigorous circulation would interfere with the cooking operations on the table. It is desirable also that the escape opening at the top of the oven structure shall be variable as to size so that the cook may by varying the size of this opening control the temperature of the oven and at the same time avoid interfering with the cooking operations. It will be desirable also at times to entirely close this outlet at the top of the oven in cases where it is more needful that the cooking operations shall be expedited than that the oven shall be heated.

Practical experience with my apparatus has demonstrated the fact that without an appreciable increase in the consumption of fuel a warming oven of large capacity and of a length approximately equal to the cooking table may be kept at a temperature sufficiently high for the purpose of warming plates etc. not only during the time the actual cooking is taking place but also for a considerable period of time thereafter, thus rendering my apparatus especially useful in restaurants where it is desirable and necessary to keep hot for a considerable period of time a number of articles of food and at the same time keep warm a considerable number of plates etc.

A feature of importance lies in locating the escape opening at the top of the oven structure and at a point about midway its length so that a gentle circulation shall be maintained in the end and top walls of the oven structure, and in order that a circulation shall be maintained in the bottom wall of the oven I preferably connect the same with the top wall by means of a centrally located conduit $j$. It is highly desirable also that the dishes in the oven shall be kept slightly moist in order that they may be given a second wiping after they are removed from the oven; this is conveniently done by making a small hole in the connecting tube $j$, although of course it will be understood that this hole may be located elsewhere in the walls of the oven.

Having thus described my invention, what I claim as new and desire to secure by Letters Patent is—

1. In combination with a steaming table consisting of a hollow metal shell whose top plate is provided with cooking-utensil-receiving openings leading to the interior of the shell whereby the water level within the shell is required to be maintained below the top of said table, said top plate being also provided at each end with a steam outlet, of a dish warming oven supported upon said steam table and consisting of hollow upright end walls having communication at their lower ends with the steam outlets in the top plate of the steam table, upper and lower horizontal hollow walls supported on said upright walls and having communication with the interior thereof, these walls being separated far enough to provide an oven chamber between them and the top wall being provided with an escape opening, and back and front walls for said oven space, substantially as and for the purpose set forth.

2. In combination with a steaming table consisting of a hollow metal shell whose top plate is provided with cooking-utensil-receiving openings leading to the interior of the shell whereby the water level within the shell is required to be maintained below the top of said table, said top plate being also provided at each end with a steam outlet, of a dish warming oven supported upon said steam table and consisting of hollow upright end walls having communication at their lower ends with the steam outlets in the top plate of the steam table, upper and lower horizontal hollow walls supported on said upright walls and having communication with the interior thereof, these walls being separated far enough to provide an oven chamber between them and the top wall being provided with an escape opening, and back and front walls for said oven space, said escape opening being provided with an adjustable valve arranged about mid-length of the top wall, substantially as and for the purpose set forth.

3. In combination with a steaming table consisting of a hollow metal shell whose top plate is provided with cooking-utensil-receiving openings leading to the interior of the shell whereby the water level within the shell is required to be maintained below the top of said table, said top plate being also provided at each end with a steam outlet, of a dish warming oven supported upon said steam table and consisting of hollow upright end walls having communication at their lower ends with the steam outlets in the top plate of the steam table, upper and lower horizontal hollow walls supported on said upright walls and having communication with the interior thereof, these walls being separated far enough to provide an oven chamber between them and the top wall being provided with an escape opening, and back and front walls for said oven space, said horizontal walls having communication with each other through a vertical conduit located at a point between the upright end walls, substantially as and for the purpose set forth.

In testimony whereof I hereunto affix my signature in the presence of two witnesses.

FRITZ HERZOG.

Witnesses:
 CHARLES D. DAVIS,
 CHARLES LOWELL HOWARD.